July 29, 1952  W. J. SANDS ET AL  2,604,835
STEERED TRACTOR MOUNTED CULTIVATOR
Filed March 28, 1945  3 Sheets-Sheet 1

July 29, 1952 — W. J. SANDS ET AL — 2,604,835
STEERED TRACTOR MOUNTED CULTIVATOR
Filed March 28, 1945 — 3 Sheets-Sheet 2

UNITED STATES PATENT OFFICE 2,604,835

STEERED TRACTOR MOUNTED CULTIVATOR

William John Sands and Archibald Greer, Belfast, Northern Ireland, assignors to Harry Ferguson, Inc., Detroit, Mich., a corporation of Delaware Application March 28, 1945, Serial No. 585,264
In Great Britain March 24, 1944

Section 1, Public Law 690, August 8, 1946
Patent expires March 24, 1964

5 Claims. (Cl. 97—50)

This invention relates to agricultural implements and especially to row crop agricultural implements such, for example, as cultivators wherein the implement is hitched to and carried by the rear of the tractor, without the use on the implement of supporting ground-engaging wheels or the like, by vertically and preferably laterally spaced links allowing the implement to swing laterally with reference to the tractor and relates especially to implements which are closely hitched and carried by three hitch links as shown, for example, in prior United States Patent No. 2,233,002, said links and the implement being supported on the tractor, that is, by the oil in the hydraulic raising and lowering power unit on the tractor and the working depth of the implement being automatically regulated in accordance with the soil or draft pressure on the implement.

An aim of the invention is to provide means whereby a rear mounted implement can be made to follow closely the row of plants or the like despite variations of the row from a straight or even line.

An object of the invention is to provide a combination which comprises a tractor and a rear assembly carried thereby including an implement having an agricultural or soil-engaging tool and a hitch connection between the implement and tractor consisting of spaced links which support the implement on the tractor and allow it to swing laterally with respect to the tractor and implement-steering means comprising an operating member so located as to be operable by an operator positioned to overlook the tool and the soil just ahead thereof, a reaction means and connection or positioning means between said operating member, reaction means and assembly such that movement of the operating member by reaction with said reaction means causes lateral movement of said assembly with reference to the tractor.

By such means the operator can steer the cultivator from side to side as required to cause the tines to follow closely any variations of the plants from a straight or even line. Thus cultivation can be effected close to the plants and in the case of very young plants which are difficult to distinguish from the surrounding weeds, the latter can be effectively uprooted, even those close to the plants. The implements, being supported by the tractor, do not require ground-engaging supporting wheels or the like. Furthermore if they are automatically controlled for depth by variations in the draft pressure, as for instance, in United States Patent 2,118,180 or 2,356,231, they have no ground engaging depth control wheel or the like. Thus, in the absence of such wheels or the like the implements can be readily swung from side to side, the response to the control means being more or less immediate so that the tines can be made to follow closely variations in the line of plants.

In accordance with a further object structure associated with the tractor constitutes the reaction means and an extra seat is provided on the tractor so that the handle can be operated by an extra operator.

In order that the invention may be more clearly understood the following specific embodiments as applied to a beet or the like cultivator for use with a tractor which has three hitch links forming a so-called unit hitch whereby the implement is hitched relatively close to the tractor and is carried thereby will now be described but merely by way of example with reference to the accompanying drawings in which:

Fig. 4 is a cross sectional view to a larger scale on the line IV, IV of Fig. 2.

Fig. 5 is a perspective detail view to a larger scale of the tiller attachment.

Fig. 6 is a sectional side view and Fig. 7 a corresponding front view of an automatic steering fin.

Figure 1:
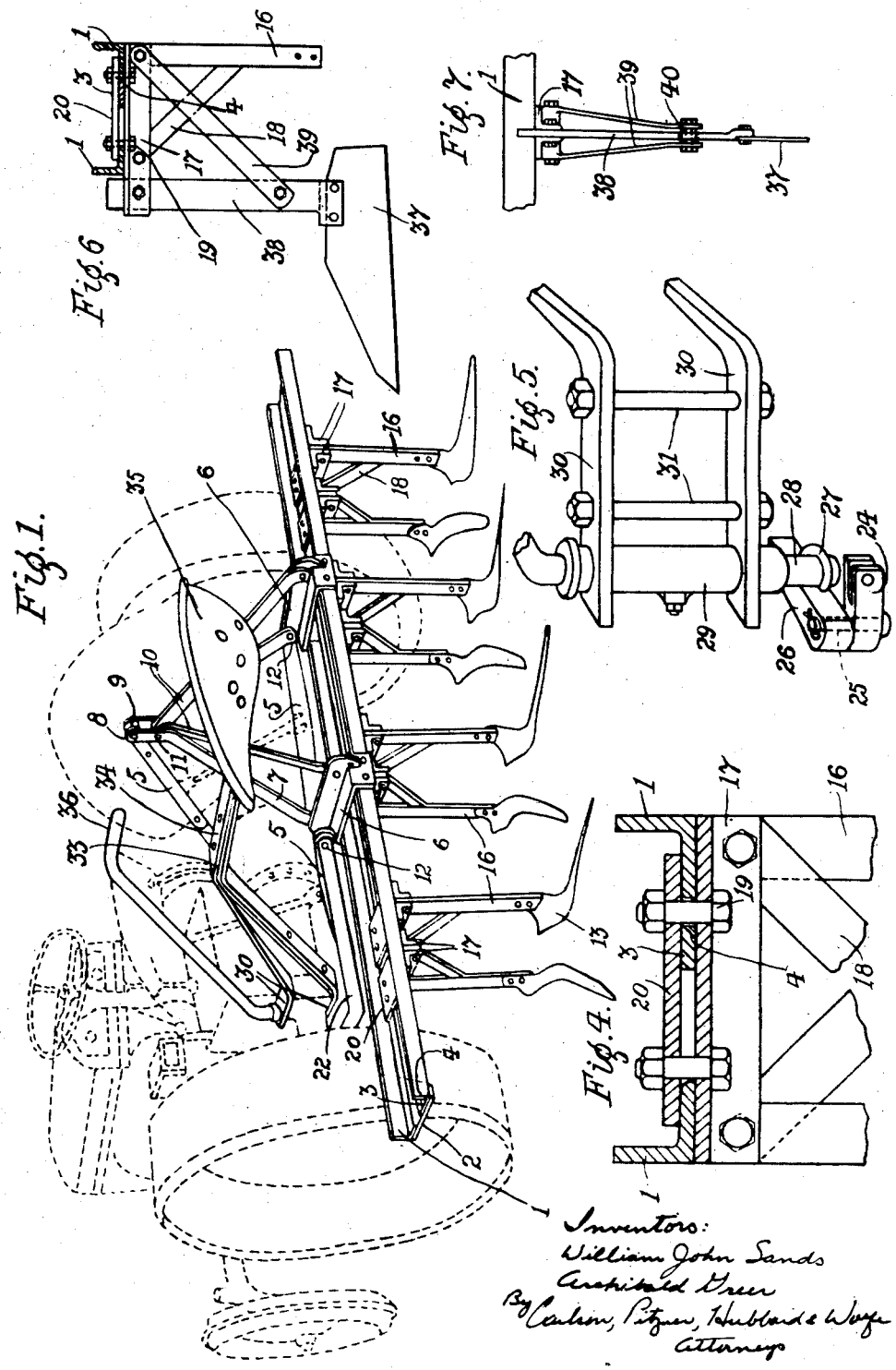
Fig. 1 is a perspective view of the cultivator attached to the tractor.
Figure 2:
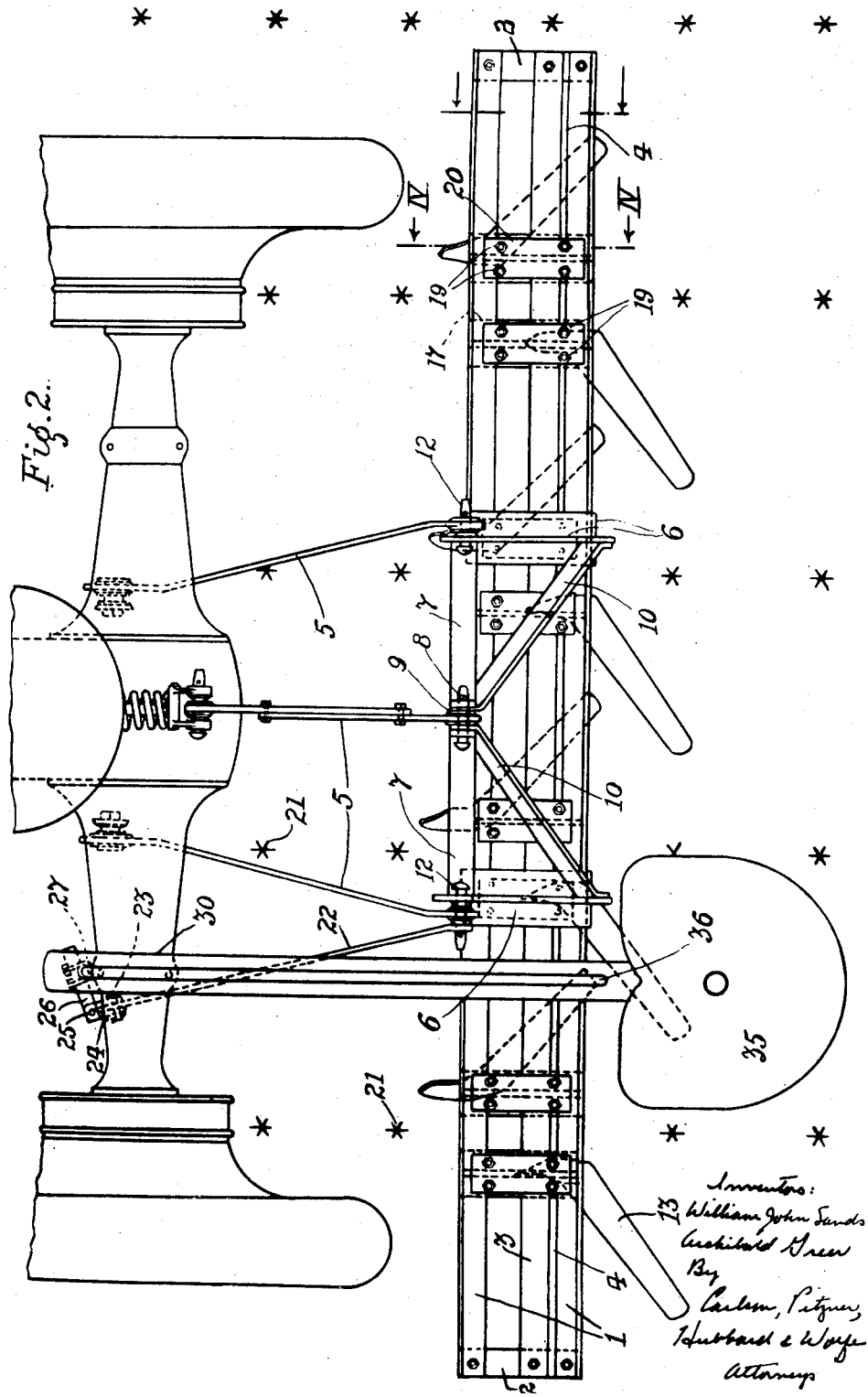
Fig. 2 is a plan view of the cultivator and Fig. 3 is a corresponding side view.

The cultivator frame comprises two transverse spaced angle members 1 connected at each end by fore and aft bars 2 which are bolted underneath the inwardly facing horizontal webs of the angle members. A transverse bar 3 is bolted on top of the bars 2 and extends from one to the other close to the horizontal web of the rear angle member 1 so as to form therewith a relatively narrow transverse guide slot 4. This slot extends without interruption across the frame.

Figure 3:
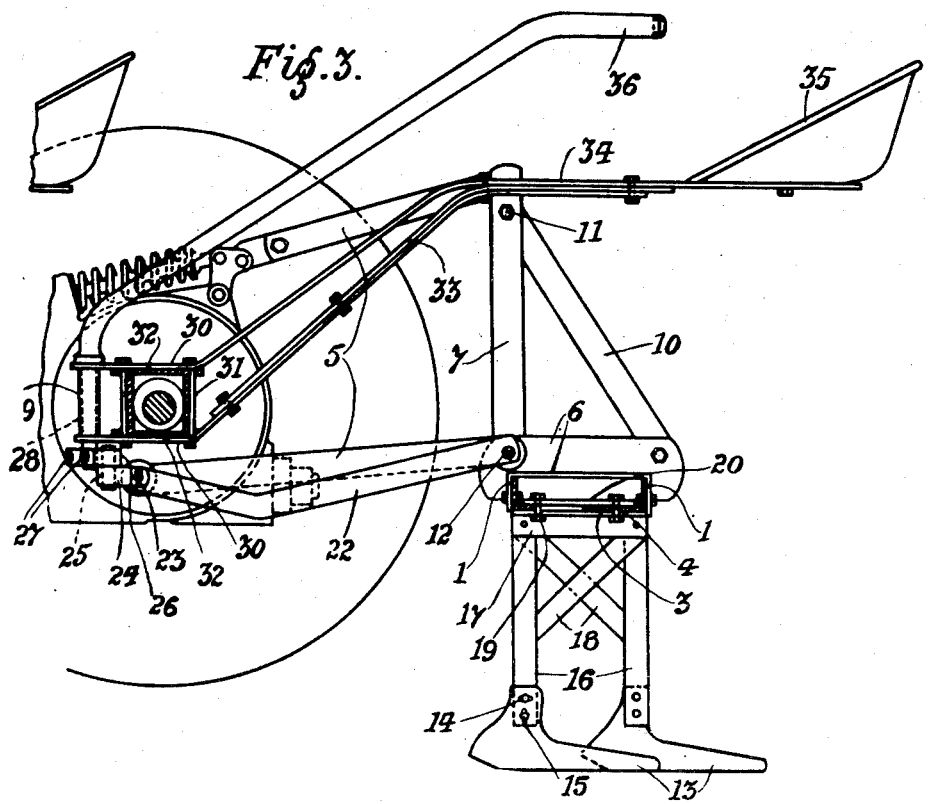

The cultivator is adapted for quick universal attachment or detachment to the usual three hitch links 5 of a Ford-Ferguson tractor by means of a structure as follows, the cultivator and the links forming a rear assembly capable of swinging laterally with respect to the tractor. Two transversely spaced fore and aft bridge members 6 are attached to the frame. Each consists of a bar bent into inverted U-form with the vertical limbs bolted outside the vertical webs of the transverse angle members 1 and the horizontal or bridge limb extending over the top edge of the vertical webs of the transverse angle members. The bridge members are stiffened by a vertical web extending across the horizontal limb and down the vertical limbs. This web consists of a bar cut to fit over the bridge member and welded thereto. As will be seen clearly from Fig. 3 the bridge members will not obstruct the lateral adjustment of the shovels as described later. At the front end of each stiffening web there is bolted a vertical stay 7, the two stays being sloped inwards towards their upper ends which receive the pin 8 adapted to engage the ball joint 9 of the upper hitch link 5. At the rear end of the stiffening web two similar stays 10 are bolted which slope inwardly and forwardly towards their upper ends which are joined to the two front stays at 11. The pins 12 for the universal attachment of the two usual lower links 5 are located at the front ends of said stiffening webs. Thus a strong triangulated stay structure is provided and the base formed by the two U-members 6 firmly braces and attaches the two transverse angle members 1.

Each shovel or soil-engaging or working tool consists of a shovel 13 of usual design for the particular crop or purpose, in this case beet cultivation, having an upward extension with an upper transverse slot 14 and a lower vertical slot 15 (Fig. 3) whereby it can be adjustably bolted to one or other side of a vertical carrier stem 16 which, at its lower end, has two corresponding holes. The upper end of the carrier stem 16 is bolted between the ends of the vertical webs of two fore and aft angle members 17 and an inclined bracing strut 18 is welded thereto whose upper end is bolted between the other ends of the said webs. The upper horizontal webs of the angle members 17 which form clamp plates have four bolts 19 passed up therethrough and preferably the bolt heads are welded underneath to the webs. Either pair of bolts can be passed up through the guide slot 4 which is of such width that the bolts are a sliding fit therein, depending on whether the tool carrier stem 16 is to be below the front or the rear transverse angle member 1 of the frame. From this it will be understood that the carrier stem is reversible so that the shovel 13 may be located at the front or the rear of the frame, it being necessary also to reverse the shovel on the carrier stem 16 when reversing the carrier. When one pair of bolts 19 have been inserted up through the guide slot 4 the other pair are just clear of the inner edge of the horizontal web of the front transverse angle member 1 of the frame and the tool stem 16 and associated structure can be clamped by means of a clamping plate 20 which is bolted on the bolts by nuts and which engages the top surfaces of the horizontal webs of the transverse angle members 1 of the frame and of the guide bar 3. Thus the shovel carrying structure is firmly clamped in position and can readily be adjusted laterally simply by loosening the nuts on the clamping plate. As the guide slot 4 is continuous or uninterrupted an infinite adjustment can be made and the spaced bolts 19 engaging the guide slot 4 ensure a parallel adjustment and prevent torsional displacement about a vertical axis.

The frame may carry any suitable number of shovels, for example, eight as shown alternatively located in the forward and rear positions and laterally set in pairs for the cultivation of four rows of plants 21.

In order to enable the cultivator to be steered to make the shovels 13 closely follow irregularities in the rows a force transmitting member or connecting link 22 is pivotally attached to the pin 12 at the rear end of one of the lower links 5 and at its forward end is pivotally connected by a horizontal pin 23 to a forked member 24 which is pivotally connected by a vertical pin 25 to a crank arm 26 adjustably fixed by U-bolt 27 on a vertical shaft 28 mounted in a bearing mounting or sleeve 29 between upper and lower clamp bars 30 which are bolted by bolts 31 on to the usual flats 32 on the rear axle for the mudguard which is removed, such removal increasing the visibility. It will be understood that the pins 23 and 25 in effect substantially form a universal joint for the link 22 and that this joint is substantially in alignment with the universal joints connecting the lower draft links to the tractor. Thus the connecting link does not interfere with vertical movement of the implement relative to the tractor and the connection of link 22 with pin 12 is sufficiently loose so as not to impede the lateral swinging of the implement. The clamp bars extend rearwardly and upwardly to form with a third intermediate bar 33 a spring arm 34 for a seat 35, which is adjustable fore and aft on the arm and which is located above the cultivator. The extra steering operator thus sits above with his feet on the cultivator frame and faces in the direction of travel and has a close overlooking view of the shovels and the approaching plants just ahead of the shovels. It will be understood that the operator's attention will normally be concentrated on the shovel and row just below him because each row in a number of simultaneously planted rows will have the same contour. Owing to the close hitching of the implement the operator can be located above the latter to obtain the said view without being too far back and causing undue transference of weight from the tractor front wheels with consequent adverse effect on the tractor steering and stability. Steering is effected by a handle or tiller 36 which is an upward and rearward extension of said shaft 28. Movement of the tiller to one or other side varies the lateral reaction force on the lower hitch links and the cultivator causing the latter to swing to the same side and thus steering can be effected.

It will be understood that the arrangement described in the preceding paragraph comprises a handle connected to the implement and to the tractor providing reaction means for causing the lateral movement of the implement.

As shown in Figs. 6 and 7 a steering knife blade or fin 37 as disclosed in prior United States Patent No. 2,195,516 may be used. It is mounted on a resilient vertical stem 38 which is attached thereto and having two converging fin stays 39 attached at their rear ends to the angle members 17 and located together at their forward end. The spacer sleeve 40 is a loose fit through a hole in the stem 38 to allow torsional yield of the latter. The fin carrying frame may also be adapted to carry a shovel at the end opposite the fin on the stem 16 in the manner already described or said stem 16 and strut 18 may be omitted. The fin gives an automatic self centering effect as disclosed in said Patent No. 2,195,516 and is used when hand steering is not being effected but it is preferably removed when the cultivator is to be steered by hand.

It will be understood that the design of the entire framework of the cultivator is such that it can be simply constructed of angle iron, bars and plates which are cut, bent or otherwise simply fashioned and welded or bolted together.

The flexibility of the lateral adjustment of the shovels can only be employed to maximum advantage with a tractor whose wheels offer also a wide range of adjustment. This is provided for in that the tractor has a front axle arrangement in accordance with prior United States Patent No. 2,247,725 which provides a wide range of adjustment and has also a wide range of rear wheel adjustment.

The top or compression link 5 is adapted in known manner to be stress responsive for controlling the lifting and lowering power unit on the tractor as for instance in the said prior Patent 2,118,180 or 2,356,231 to control the working depth of the shovels automatically in accordance with the soil or draft pressure on the shovels. Thus there are no depth regulating wheels or the like to impede the lateral steering movement.

What we claim is:

1. For use with a tractor having a plurality of vertically and laterally spaced links capable of lateral swinging movement relative to said tractor, the combination comprising a soil-working implement connected to and carried by said links for bodily movement with the rear ends thereof, a forwardly extending link pivotally mounted on said implement for transmitting a reactive force between said implement and said tractor, a crank member having a crank arm connected to the forward end of said link and having a rearwardly projecting handle for adjusting said link and thus steering the implement, an operator's seat located over the implement and conveniently arranged with respect to said handle, and clamping means adapted for mounting on the rear portion of said tractor for not only supporting said seat but also for providing a bearing for said crank member.

2. For use with an implement carried on a tractor by a plurality of transversely and vertically spaced hitch links, said links having pivotal mountings at their end portions for connection to the rear portion of said tractor and to said implement respectively for vertical and lateral swing relative to the tractor, the combination of variable force means including a force transmitting member and crank pivotally connected to one end of said force member, said means being interposed between said tractor and said implement for applying a lateral force to the latter, said means also including a pair of pivotal connections having horizontal axes in substantially axial alinement with respective ones of the pivotal mountings for one of said hitch links to permit raising and lowering of said implement relative to the tractor without interference of said force means, and a handle on said crank for manually varying said force means to position said implement laterally relative to the tractor.

3. In an implement for use with a tractor having a plurality of transversely and laterally spaced hitch links, said links being pivotally mounted on the rear portion of said tractor for vertical and lateral swing relative thereto, said implement having a plurality of transversely and laterally spaced hitch pins for pivotally engaging the rear end portions of individual ones of said hitch links, the combination comprising a force transmitting member extending forwardly from said implement and having means at its trailing end portion for pivotally engaging the hitch pin for one of said hitch links, a crank including a crank arm adapted for pivotal attachment to the rear portion of said tractor, a universal coupling for interconnecting the forward end portion of said force member and said crank arm, said universal coupling being positioned substantially in alinement with the pivotal mounting on the rear portion of said tractor for the said one of the hitch links to permit free raising and lowering of the implement relative to the tractor, and a handle on said crank for positioning the implement laterally with respect to the tractor.

4. In an implement for use with a tractor having a plurality of transversely and vertically spaced hitch links capable of lateral swing and pivotally mounted at their end portions to the implement and the tractor respectively for bodily raising and lowering the implement, a combination comprising a crank including a crank arm adapted to be mounted on said tractor for pivotal movement about a vertical axis, a force transmitting member extending rearwardly from said crank arm to said implement, a universal coupling for interconnecting said crank arm in the forward end portion of said force member, a horizontal pivotal connection between the rear end portion of said force member and said implement to permit relative vertical swing therebetween, said horizontal pivotal connection being spaced laterally of said crank arm and substantially in axial alinement with the pivotal mounting of one of said hitch links on the implement, said crank being positioned such that the universal coupling is substantially in axial alinement with the pivotal mounting of the said one of the hitch links on the tractor when the implement is in its normal transverse position relative to the tractor to permit raising and lowering of said implement without interference of said force member, and a handle on said crank for manually positioning said implement laterally relative to the tractor.

5. For use with a soil working implement bodily supported on a tractor by a plurality of transversely and vertically spaced hitch links universally connected adjacent their end portions to the rear of the tractor and to the implement respectively for raising and lowering said implement and permitting lateral swing of the latter relative to the tractor, the combination comprising an operator's seat having a forwardly extending support bar, a crank having a crank arm, a clamp on the forward end portion of said support bar for attachment to the rear portion of said tractor, said clamp having a bearing for pivotally supporting said crank, a force transmitting member having a universal connection adjacent one end for engagement with said crank arm, the other end of said force member being adapted for pivotal connection to said implement at a point transversely spaced from the universal connection, said universal connection and said pivotal connection being so positioned relative to the hitch links that said force member does not interfere with the raising and lowering of said implement relative to the tractor, and a rearwardly extending handle on said crank for manually steering said implement laterally with respect to the tractor.

WILLIAM JOHN SANDS.
ARCHIBALD GREER.

(References on following page)

REFERENCES CITED

The following references are of record in the file of this patent:

UNITED STATES PATENTS

| Number | Name | Date |
|---|---|---|
| 445,846 | Butt | Feb. 3, 1891 |
| 445,847 | Butt | Feb. 3, 1891 |
| 828,615 | Lindgren | Aug. 14, 1906 |
| 872,461 | Schofield et al. | Dec. 3, 1907 |
| 1,354,556 | Holt | Oct. 5, 1920 |
| 1,718,773 | Benjamin | June 25, 1929 |
| 1,898,353 | Everett et al. | Feb. 21, 1933 |
| 2,029,249 | Noel et al. | Jan. 28, 1936 |
| 2,070,155 | Day, Jr. | Feb. 9, 1937 |
| 2,195,516 | Ferguson | Apr. 2, 1940 |
| 2,368,312 | Luger | Jan. 30, 1945 |

FOREIGN PATENTS

| Number | Country | Date |
|---|---|---|
| 549,114 | Great Britain | Nov. 6, 1942 |